US012258942B2

United States Patent
Noonan et al.

(10) Patent No.: US 12,258,942 B2
(45) Date of Patent: Mar. 25, 2025

(54) TIP AIR RECEPTOR

(71) Applicant: BLADE DYNAMICS LIMITED, Eastleigh (GB)

(72) Inventors: Mark Thomas Noonan, Eastleigh (GB); Paul Trevor Hayden, Eastleigh (GB); Harald Behmer, Eastleigh (GB)

(73) Assignees: BLADE DYNAMICS LIMITED, Eastleigh Hampshire (GB); LM WIND POWER US TECHNOLOGY APS, Kolding (DK)

( * ) Notice: Subject to any disclaimer, the term of this patent is extended or adjusted under 35 U.S.C. 154(b) by 161 days.

(21) Appl. No.: 17/910,623

(22) PCT Filed: Apr. 21, 2021

(86) PCT No.: PCT/EP2021/060412
§ 371 (c)(1),
(2) Date: Sep. 9, 2022

(87) PCT Pub. No.: WO2021/214150
PCT Pub. Date: Oct. 28, 2021

(65) Prior Publication Data
US 2023/0167806 A1    Jun. 1, 2023

(30) Foreign Application Priority Data
Apr. 23, 2020    (GB) .................... 2005958

(51) Int. Cl.
*F03D 80/30*    (2016.01)
*F03D 1/06*    (2006.01)

(52) U.S. Cl.
CPC ........... *F03D 80/30* (2016.05); *F03D 1/0675* (2013.01); *F05B 2240/302* (2013.01);
(Continued)

(58) Field of Classification Search
CPC .......... F03D 80/30; F03D 1/0675; F03D 1/06; F05B 2240/307; F05B 2240/302; F05B 2280/105; F05B 2280/1072
See application file for complete search history.

(56) References Cited

U.S. PATENT DOCUMENTS

| 6,612,810 B1 | 9/2003 | Olsen et al. |
| 8,449,259 B1 | 5/2013 | Kaser |

(Continued)

FOREIGN PATENT DOCUMENTS

| CN | 106762469 A | 5/2017 |
| CN | 108150365 A | 6/2018 |

(Continued)

OTHER PUBLICATIONS

Zhang, Rui-jia, "With Metal Tip Fan Blade Lightning Protection Device," CN 106762469 A, May 31, 2017 (Year: 2017).*

(Continued)

*Primary Examiner* — David E Sosnowski
*Assistant Examiner* — Joshua R Beebe
(74) *Attorney, Agent, or Firm* — Nath, Goldberg & Meyer; Jerald L. Meyer; Tanya E. Harkins

(57) ABSTRACT

Disclosed is a tip section for a wind turbine blade. The tip section comprises an intermediary blade section comprising a first shell part forming a first side of the intermediary blade section and a second shell part forming a second side of the intermediary blade section, the intermediary blade section having a leading edge and a trailing edge and extending from an intermediary blade section first end to an intermediary blade section second end; a tip part forming an end of the tip section and having been rigidly attached to the intermediary blade section first end, the tip part having an outer surface comprising a metal area; and a number of one or more superficial metal strips extending along an outer surface of (Continued)

the intermediary blade section. A wind turbine blade with such a tip section and the manufacturing of such a wind turbine blade is also disclosed.

19 Claims, 9 Drawing Sheets

(52) U.S. Cl.
CPC ... *F05B 2240/307* (2020.08); *F05B 2280/105* (2013.01); *F05B 2280/1072* (2013.01)

(56) References Cited

U.S. PATENT DOCUMENTS

| | | |
|---|---|---|
| 2004/0028528 A1 | 2/2004 | Flemming |
| 2008/0193292 A1 | 8/2008 | Stam et al. |
| 2009/0056968 A1 | 3/2009 | Bertelsen |
| 2009/0139739 A1 | 6/2009 | Hansen |
| 2010/0090472 A1 | 4/2010 | Berthelsen |
| 2010/0329881 A1 | 12/2010 | Mendez Hernandez et al. |
| 2011/0182731 A1 | 7/2011 | Naka et al. |
| 2012/0003094 A1* | 1/2012 | Hansen ................... F03D 80/30 29/889.71 |
| 2012/0287549 A1 | 11/2012 | Tanaka et al. |
| 2012/0301300 A1 | 11/2012 | Muto |
| 2013/0098651 A1 | 4/2013 | Suzuki et al. |
| 2013/0149153 A1 | 6/2013 | Fujioka et al. |
| 2014/0341738 A1 | 11/2014 | Bech et al. |
| 2014/0348654 A1 | 11/2014 | Klein |
| 2015/0308415 A1 | 10/2015 | Rajasingam et al. |
| 2016/0090968 A1 | 3/2016 | Hansen |
| 2016/0222945 A1 | 8/2016 | Shiraishi et al. |
| 2016/0245264 A1 | 8/2016 | Søgaard et al. |
| 2016/0258423 A1 | 9/2016 | Whitehouse et al. |
| 2017/0321661 A1 | 11/2017 | Mieritz et al. |
| 2017/0328350 A1 | 11/2017 | Bendlak et al. |
| 2017/0335830 A1 | 11/2017 | Ohlerich et al. |
| 2018/0094621 A1 | 4/2018 | Olsen et al. |
| 2018/0135602 A1* | 5/2018 | Tobin .................... F03D 1/0675 |
| 2019/0162171 A1 | 5/2019 | Jensen et al. |
| 2019/0383272 A1 | 12/2019 | Murata et al. |
| 2020/0095983 A1* | 3/2020 | Girschig ............... F03D 80/507 |
| 2020/0318618 A1* | 10/2020 | Barton .................... F03D 80/30 |
| 2021/0332788 A1* | 10/2021 | Sato ........................ F03D 80/30 |

FOREIGN PATENT DOCUMENTS

| | | |
|---|---|---|
| EP | 3508719 A1 | 7/2019 |
| WO | 2005031158 A2 | 4/2005 |
| WO | 2011080177 A1 | 7/2011 |
| WO | 2013007267 A1 | 1/2013 |
| WO | 2018050196 A1 | 3/2018 |
| WO | 2018196967 A1 | 11/2018 |
| WO | 2019091533 A1 | 5/2019 |
| WO | 2019120416 A1 | 6/2019 |

OTHER PUBLICATIONS

Fujioka, Hideyasu, "Wind Turbine and Wind Power Generation Device Machine Translation" WO 2013084634 A1, WIPO Jun. 13, 2013 (Year: 2013).*

He, Heng Xin et al., "Lightning Flash Device Machine Translation" CN 108150365 A, Jun. 12, 2018 (Year: 2018).*

* cited by examiner

303

303

314a

1114

301

TIP AIR RECEPTOR

The present invention relates to a lightning receptor for a wind turbine blade.

This is a National Phase Application filed under 35 U.S.C. 371 as a national stage of PCT/EP2021/060412, filed Apr. 21, 2021, an application claiming the benefit of British Patent Application No. 2005958.0, filed Apr. 23, 2020, the content of each of which is hereby incorporated by reference in its entirety.

BACKGROUND

As the demand for blades for wind turbines tends towards blades of increasing length, a need concurrently arises for manufacture of blades having increased rigidity and a comparatively low weight. One way of achieving these properties is to combine various types of fibres in the laminate of the blades, for instance combining glass fibre parts and carbon fibre parts. Combinations with other types of fibres are thus also possible. A combination of e.g. glass fibres with carbon fibres in a so-called hybrid laminate has the problem that the carbon fibres attract lightning, and a lightning strike directly into the laminate may cause significant damage to a blade comprising electrically conductive fibres, as they conduct current and thereby are heated, which may weaken the material. In a composite part made of different layers, including carbon layers, the heating in a carbon fibre layer can cause a delamination, which weakens the part. Other blade parts, such as shear webs, may also comprise carbon fibres and therefore attract lightning.

Since carbon fibres are very attractive, there is a need to reduce the risk that lightning strikes into these parts and causes damage, maybe even catastrophic failure. However, the problem is not limited to blades that incorporate carbon fibres.

Wind turbine blades with metallic tips can help reduce the damage to the blade tip. In existing solutions, lightning current is conducted by a conductor extending from the metallic tip inside the blade, to a downconductor.

SUMMARY OF THE INVENTION

It is an object of the present invention to provide a wind turbine blade that is less susceptible to being damaged by lightning that strikes the blade near the tip end.

The inventors have found an alternative solution that, contrary to expectations, can reduce the risk of damage to a wind turbine blade tip when lightning strikes near the tip.

A first aspect of the invention provides a tip section for a wind turbine blade. The tip section comprises:
- an intermediary blade section comprising a first shell part forming a first side of the intermediary blade section and a second shell part forming a second side of the intermediary blade section, the intermediary blade section having a leading edge and a trailing edge and extending from an intermediary blade section first end to an intermediary blade section second end,
- a tip part forming an end of the tip section and having been rigidly attached to the intermediary blade section first end, the tip part having an outer surface comprising a metal area,
- a number of one or more superficial metal strips extending along an outer surface of the intermediary blade section.

Known metallic tips on wind turbine blades are very difficult to replace when damaged, because they are not attached with replacement in mind. They are firmly attached inside the blade shell and are therefore difficult to access, let alone replace in a reliable manner.

The present invention alleviates this problem by providing metal parts as part of a separate tip module—the tip section—which is relatively easy to replace. Replacement is performed simply by removing the lightning-damaged tip section and attaching a new tip section.

The shell parts are substantially non-conductive, made for instance of a material comprising a glass-fibre reinforced composite. The shell parts may be made entirely of a composite, such as glass-fibre reinforced composite material. Carbon fibres can be included, but the risk of lightning striking the substantially non-conductive shell parts increases, since carbon fibres increase the conductivity to some extent.

In some embodiments, a length of at least one of, such as all of, the superficial metal strips is in the range 20-210 cm, such as in the range 20-160 cm, such as in the range 30-110 cm, such as in the range 30-60 cm. This is relatively short compared to typical blade lengths, which are frequently longer than 50 m. Thus, the metal strips are relatively short compared to typical blades. However, it provides enough additional surface to significantly reduce the risk of lightning striking the shell parts, which are substantially non-conductive.

In some embodiments, a width of at least one of, such as all of, the superficial metal strips are in the range 30-100 mm. This provides a good areal coverage and conductivity without adding unnecessary weight.

The width is for instance measured perpendicularly to a longitudinal axis of the tip section, which typically coincides with a longitudinal axis of the blade that the tip section is made for. It may alternatively be measured along a local chord of the tip section. Alternatively, it is measured with respect to a (in some cases curved) line that runs halfway between the leading edge and the trailing edge of the tip section. For a rectangular metal strip, the width is simply the shorter side of the metal strip, and the length is the longer side. The person skilled in the art will appreciate that depending on the shape of the metal strip, a less rigid definition is required for assessing length and width. For instance, an elongated tapered metal strip has a width that varies along a longitudinal axis of the metal strip.

In some embodiments, a thickness of at least one of, such as all of, the superficial metal strips is in the range 2-30 mm, such as in the range 2-20 mm, such as in the range 2-10 mm, such as in the range 2-5 mm. The thickness is typically determined as an extent of the metal strip in a direction normal to the shell part on which the metal strip is arranged. In a shell part with a recess for accommodating the metal strip, the depth of the recess substantially corresponds to the thickness of the metal strip to make the metal strip flush with the surrounding shell part.

The thickness may vary along the metal strip, but a constant cross-sectional area is advantageous. A metal strip with a constant thickness is easy to manufacture, for instance by cutting it out of a sheet of metal.

In some embodiments, a length of the tip part is at most 500 mm, such as in the range 5-500 mm, such as in the range 30-500 mm, such as in the range 30-200 mm, such as in the range 30-100 mm. In some embodiments, a length of an exposed part of the tip part is in the range 10-500 mm, such as in the range 10-300 mm, such as in the range 10-200 mm, such as in the range 30-100 mm. The length of the tip part can be determined for instance according to the examples above in relation to the lengths of metal strips.

In some embodiments, at least one superficial metal strip of the tip section is arranged at a distance from the leading edge and the trailing edge, i.e. is not in contact with the leading edge or the trailing edge. In some embodiments, every superficial metal strip of the tip section is arranged at a distance from the leading edge and the trailing edge, i.e. not in contact with the leading edge or the trailing edge. In some embodiments, the distance is at least 5 cm, such as at least 10 cm, such as at least 20 cm, from the leading edge and the trailing edge. Preferably, at least one, preferably all, superficial metal strips of the tip section are placed near a thickest portion of the intermediary blade section.

In some embodiments, a chordwise position of a centerline of at least one superficial metal strip lies in the range $x=0.2$ to $x=0.7$, such as in the range $x=0.3$ to $x=0.6$, where $x$ is the chordwise airfoil coordinate and $x=0$ coincides with the airfoil leading edge and $x=1$ coincides with the airfoil trailing edge. Such a position is advantageous in protecting the blade and at the same time protects the metal strip from significant wear. Furthermore, the surface curvature in this range is often low enough that an entirely flat metal strip having sufficient conductance can be accommodated in a recess in the surface of the shell, making manufacturing of the tip section easier.

In some embodiments, the one or more superficial metal strips are substantially parallel to a longitudinal axis of the intermediary blade section. At least, a projection of the metal strip onto a plane defined by the longitudinal axis and a local chord may be parallel to the longitudinal axis, or at least within an angle of 0-20 degrees, such as within 0-15 degrees, such as within 5-15 degrees. It is noted that a projection of the metal strip onto a plane normal to a local chord typically forms an angle with the longitudinal axis of the intermediary blade section, since the metal strip follows the surface of the shell part, which diverges from the longitudinal axis in a direction towards the second end of the intermediary blade section because the shell thickens towards the root end.

In some embodiments, the one or more superficial metal strips are arranged in corresponding recesses in the shell parts to achieve a flush surface. This results in better noise performance than if the metal strips are arranged on an already aerodynamic profile.

In some embodiments, the one or more superficial metal strips are arranged in corresponding recesses in the tip part to achieve a flush surface.

In some embodiments, the number of superficial metal strips is exactly one. The one metal strip is arranged on the first shell part or on the second shell part.

In some embodiments, the tip section further comprises:
a downconductor coupler arranged inside the intermediary blade section, the tip part being electrically connected to the downconductor coupler only via the one or more superficial metal strips.

The use of the word "only" above signifies that the tip part is not electrically connected to the downconductor coupler via a conductor that extends from the tip part directly to the downconductor coupler or other downconductor elements via the inside of the intermediary blade section, not the outside. It has been found by the inventors that by excluding such a conductor, the risk of tip damage may actually be reduced, contrary to expectations. The shell parts are relatively thin near the tip, and there is in fact a significant risk that lightning flashes over from the outside to a conductor located inside the shell, close to the tip end. Embodiments of the present invention mitigate this problem.

In some embodiments, the downconductor coupler comprises a metal piece, such as a solid metal piece, that extends to an outer surface of the first shell part where it is electrically connected to the exactly one metal strip.

In some embodiments, the number of superficial metal strips is exactly two, and a first metal strip of the two superficial metal strips is arranged on the first side of the intermediary blade section, and a second metal strip of the two superficial metal strips is arranged on the second side of the intermediary blade section. This provides better performance than having only one strip. Although a single metal strip attracts lightning, tests have shown that there is a significant risk that lightning does not attach to the one metal strip, but instead attaches to the opposite side, causing damage to that shell part. Being arranged on respective sides, the two metal strips do not cover the leading edge or the trailing edge of the intermediary blade section.

In some embodiments, the downconductor coupler comprises a metal piece, such as a solid metal piece, that extends to an outer surface of the first shell part where it is electrically connected to the first metal strip, and the metal piece further extends to an outer surface of the second shell part where it is electrically connected to the second metal strip. Extending to the outer surfaces, such a metal piece also acts as lightning receptor. The metal piece can be made by joining one or more separate metal pieces, each of which can be made of same or different metals or metal alloys.

The downconductor coupler may alternatively comprise one or more cables attached to respective separate lightning receptors arranged in the first and/or the second shell part, as is often used, rather than the downconductor coupler being a piece of metal that also acts as lightning receptor. Separate lightning receptors arranged in shell parts are well known. In a shell part, they are typically arranged in corresponding recesses in the shell part or in corresponding throughgoing holes in the shell part and are typically exposed at the outer surface of the shell part.

In some embodiments, a length of the intermediary blade section is in the range 15-200 cm, such as in the range 15-100 cm, such as in the range 20-70 cm, such as in the range 30-60 cm. The length of the section can be measured for instance according to the examples given above in relation to the lengths of metal strips.

In some embodiments, the tip part is entirely metallic. This provides a particularly robust solution. A tip part made of several parts is more susceptible to being damaged and to breaking apart.

In some embodiments, the tip part is bonded to the intermediary blade section, for instance using an epoxy or polyurethane or equivalent material.

In some embodiments, the tip part is hollow. This reduces weight and allows bonding material to attach to larger surface areas compared to using a solid tip part.

In some embodiments, one or more of the metal strips are subsequently attached to the tip part, such as by screw means or bolt means or by soldering, or a combination thereof. In some embodiments, the tip part and one or more of the metal strips, such as all the metal strips, are formed integrally. This eliminates the need for having to subsequently attach the metal strip to the tip part.

In some embodiments, the tip part is made of copper or copper alloy, such as Copper-Tellurium (CW118C/C109). Other metals or alloys can be used.

In some embodiments, the one or more metal strips are made of copper or copper alloy, such as Copper-Tellurium (CW118C/C109). Other metals or alloys can be used.

In some embodiments, a length of at least one of, such as all of, the superficial metal strips is in the range 20-210 cm, a width of at least of one, such as all of, the superficial metal strips is in the range 30-100 mm, a thickness of at least of one, such as all of, the superficial metal strips is in the range 2-30 mm, and a length of the tip part is in the range 30-200 mm. This combination is very advantageous, as it strikes a good balance for instance between performance and weight. Performance especially refers to the reduction of the risk that lightning strikes the substantially non-conductive shell parts of the tip section.

In some embodiments, a total superficial area of the one or more metal strips is at most 8 times a total exposed metal area of the tip part, such as in the range 2-8 times, such as in the range 3-6 times the total exposed metal area of the tip part. The tip part may extend into the intermediary blade section, but this area does not contribute as much to attracting lightning. The limitation of the ratio between the total superficial area of the one or more metal strips relative and the total exposed metal area of the tip part is in some cases important because it provides a particularly good balance between performance and weight.

In some embodiments, the tip section further comprises a non-conducting barrier, such as a solid barrier, such as a solid barrier made of polyurethane or epoxy, the barrier being adapted to electrically separate the tip part from the downconductor coupler. This may significantly decrease the risk of flashover between the tip part and conductive parts inside the blade, such as the downconductor coupler, a carbon-based spar cap or other conductive elements.

In a second aspect, the invention provides a wind turbine blade having a root end and a tip end. The wind turbine blade is characterised at least in that it comprises an embodiment of a tip section in accordance with the first aspect.

In some embodiments, the wind turbine blade comprises a first blade part having an airfoil region, a root end connectable to a wind turbine hub, and a first end opposite the root end, the first end of the first blade part being rigidly joined to the tip section at the second end of the intermediary blade section of the tip section. The first blade part and the intermediary blade section are adapted in such a way as to form, when joined together, a smooth aerodynamic profile. It is preferable that the combination results in a blade shape that the person skilled in the art will recognize as being advantageous. It is therefore advantageous that the second end of the intermediary blade section and the first end of the first blade part have a substantially identical cross-section. Otherwise, the combined surface will change drastically across the interface between the two parts, and the aerodynamic properties will suffer. In some embodiments, a thickness of a wall of the first blade part at the first end comprises a step that overlaps with a wall of the intermediary blade section to form a flush blade surface. This provides a particularly strong connection between the first blade part and the tip section.

The first blade part and the tip section may for instance be joined using an adhesive and/or by mechanical fastening means.

In some embodiments, the one or more superficial metal strips are substantially parallel to a longitudinal axis of the first blade part.

In a third aspect, the invention provides a method of manufacturing a wind turbine blade having a root end and a tip end. The method comprises:
providing a first blade part having an airfoil region, a root end connectable to a wind turbine hub, and a first end opposite the root end,
providing a tip section in accordance with an embodiment of the first aspect of the invention, and
rigidly joining the first end of the first blade part to the second end of the intermediary blade section of the tip section.

In some embodiments of the third aspect, the first blade part comprises the lightning receptor(s) and the downconductor coupler, either as separate elements or using a downconductor doubling as lightning receptor, as discussed above. In joining the first blade part and the tip section, the one or more metal strips are joined to the lightning receptor (s), for instance by screw means or bolt means or by soldering, or a combination thereof. In the case where a metal piece doubles as the lightning receptor(s), the metal strips can be attached to the metal piece for instance by screw means or bolt means or by soldering, or a combination thereof.

In some embodiments of the third aspect, the downconductor coupler is part of tip section.

As can be seen, the invention provides a way to relatively easily manufacture a wind turbine blade having a metallic tip that is relatively easy to replace after damage from lightning.

In some embodiments, the method further comprises attaching a first downconductor to the downconductor coupler, the first downconductor being arrangeable to conduct lightning current from the downconductor coupler towards the root end of the blade, such as from the downconductor coupler to the root end. The first downconductor may be made up of several sections along the blade, or it may be a single integral conductor, such as a single cable section. The first downconductor may comprise a single current path or two or more parallel current paths.

In some embodiments, the method further comprises surrounding the downconductor coupler with a non-conductive material, such as polyurethane or epoxy, after attaching the first downconductor to the downconductor coupler.

In some embodiments, the method further comprises adding a non-conducting barrier, such as a solid barrier, such as a solid barrier made of polyurethane or epoxy, inside the tip section, the barrier being adapted to electrically separate the tip part and the downconductor coupler. This reduces the risk of flashover from the tip part to the downconductor coupler. Other dielectric materials can be used.

A fourth aspect of the invention provides a tip section for a wind turbine blade. The tip section comprises:
an intermediary blade section comprising a first shell part forming a first side of the intermediary blade section and a second shell part forming a second side of the intermediary blade section, the intermediary blade section having a leading edge and a trailing edge and extending from an intermediary blade section first end to an intermediary blade section second end,
a downconductor coupler arranged inside the intermediary blade section, and
a tip part forming an end of the tip section and having been rigidly attached to the intermediary blade section first end, the tip part having an outer surface comprising a metal area, the tip part being electrically connected to the downconductor coupler only via a number of one or more superficial metal strips extending along an outer surface of the intermediary blade section, each superficial metal strip being connected to the downconductor coupler via a corresponding lightning receptor arranged in the first side of the intermediary blade section or in the second side of the intermediary blade section.

BRIEF DESCRIPTION OF THE DRAWINGS

The invention is explained in detail below with reference to the embodiments shown in the drawings.

DETAILED DESCRIPTION OF SELECTED EMBODIMENTS

Figure 1:
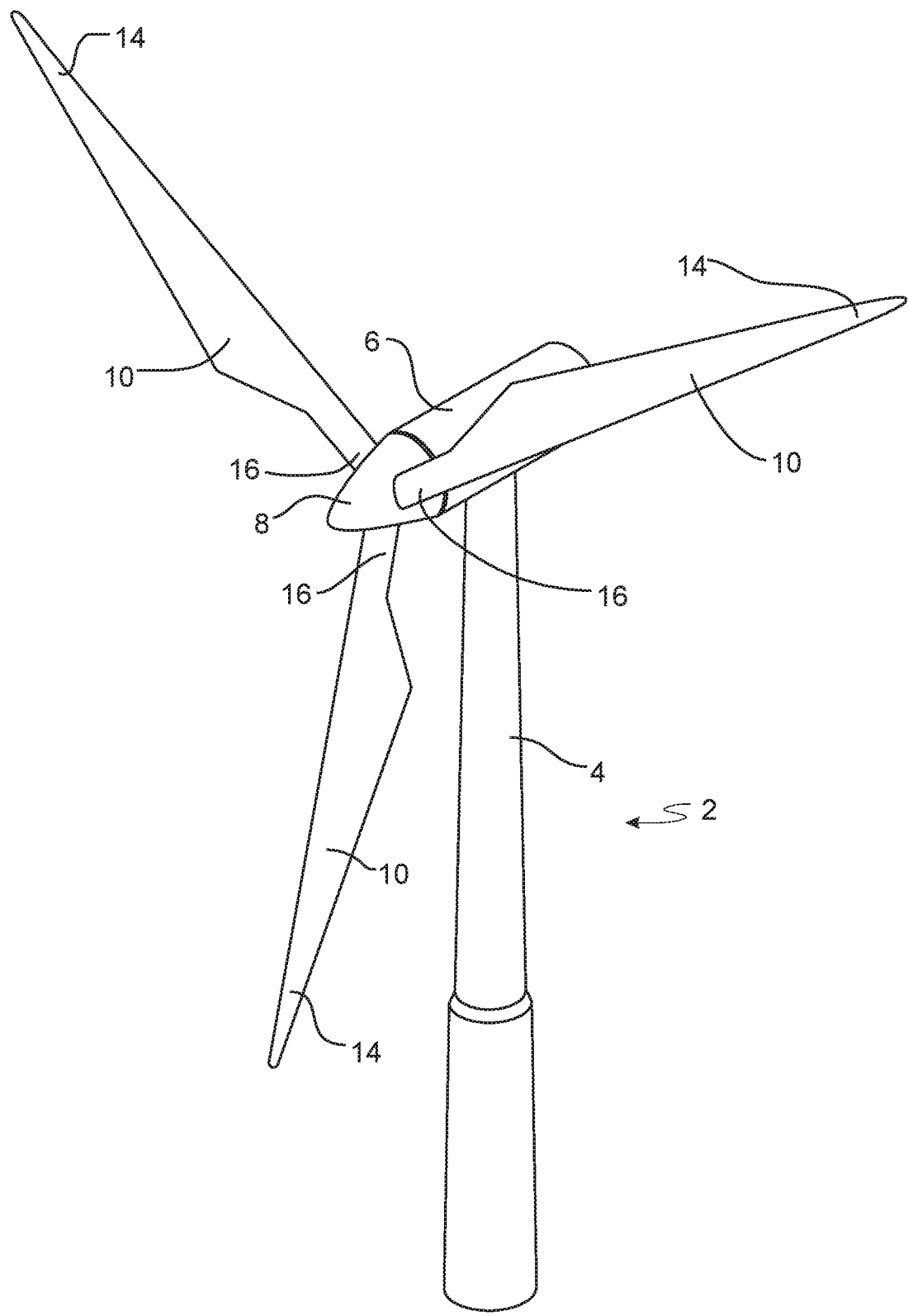
FIG. 1 illustrates a wind turbine.

Embodiments of the invention will be described in more detail in the following with reference to the accompanying drawings. Like reference numerals may refer to like elements throughout. The drawings show selected ways of implementing the present invention and are not to be construed as being limiting.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
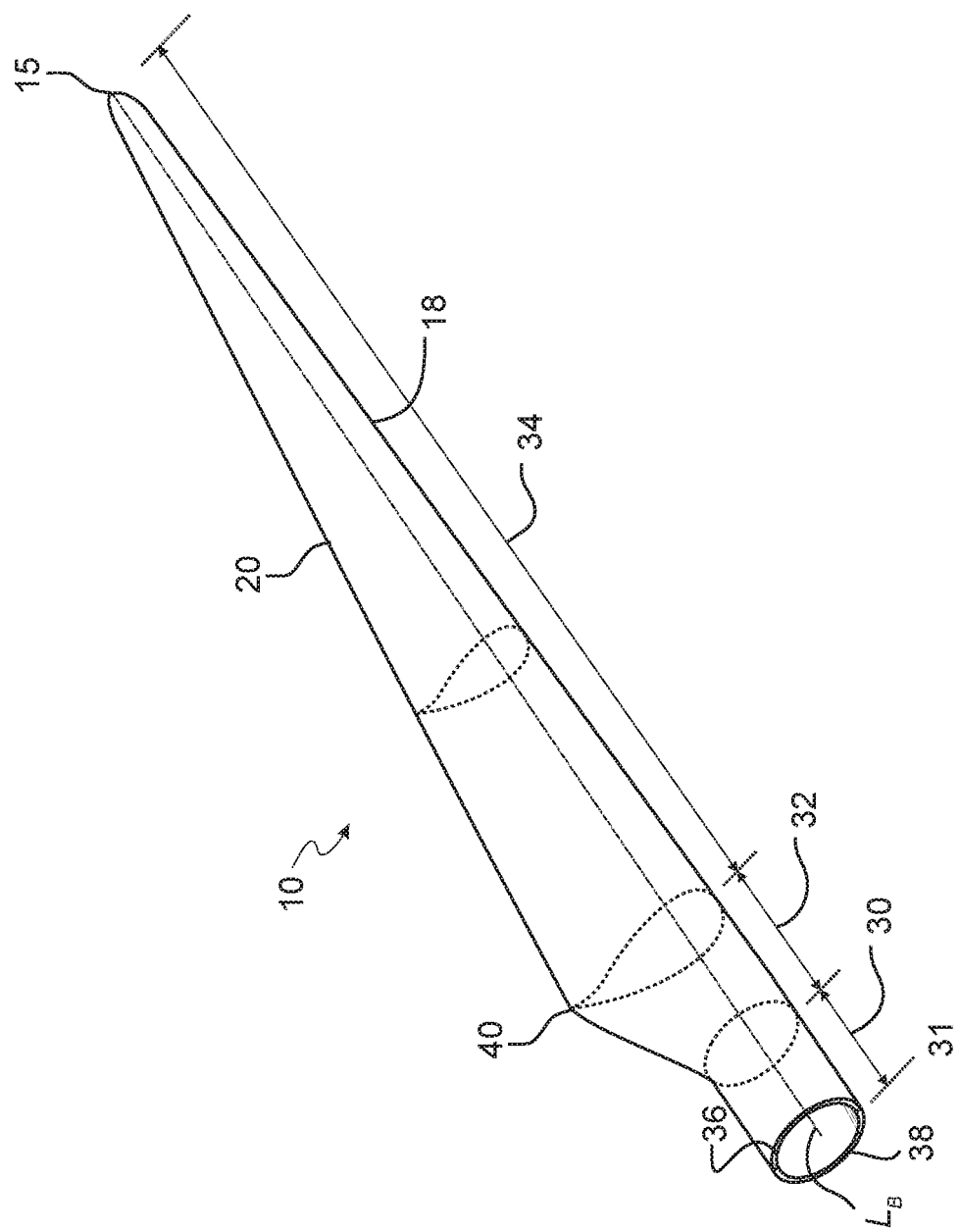
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15, opposite the root end 31 that attaches to the wind turbine hub 8.

The airfoil region 34 (also called the profiled region) of the wind turbine has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance from the hub.

A shoulder 40 of the blade 10 is defined as the position where the blade 10 has its largest chord length. The shoulder 40 is typically provided at the boundary between the transition region 32 and the airfoil region 34. FIG. 2 also illustrates the longitudinal extent $L_B$, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge 20 of the blade 10.

Figure 3:
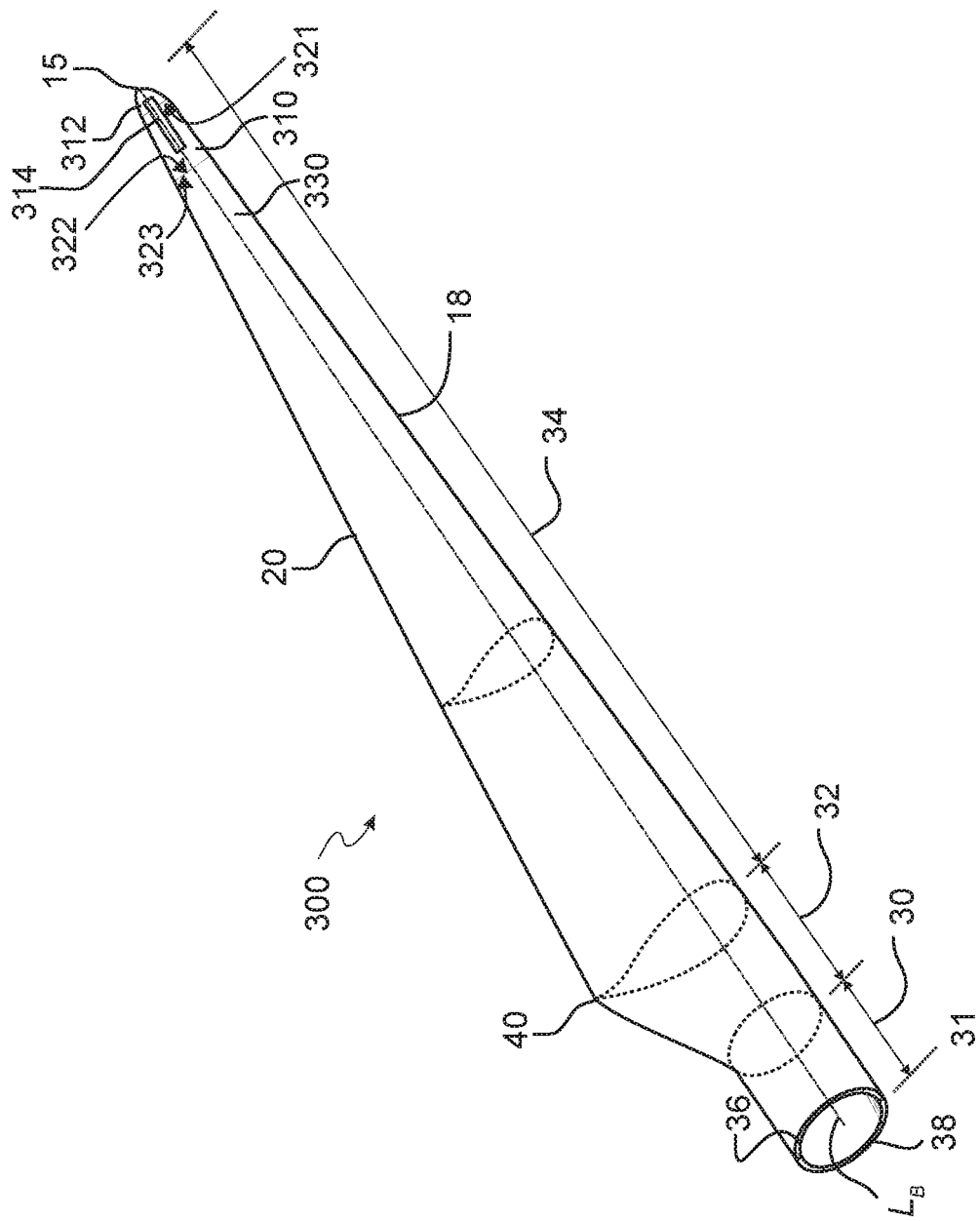
FIG. 3 shows a schematic view of a wind turbine blade in accordance with an embodiment of the invention.

FIG. 3 shows a wind turbine blade 300 in accordance with an embodiment of the invention. Generally, it is similar to the known wind turbine blade 10 shown in FIG. 2. However, the tip region is different from known wind turbine blade tips. The blade 300 has a first blade part 330 that extends from the root end 31, which is eventually attached to a wind turbine hub, to a first end 323. The first end 323 is attached to a tip section that has an intermediary blade section 310 and a tip part 312, attached to a first end 321 of the intermediary blade section 310. The tip part 312 is made of metal, such as copper. A metal strip 314 on the outer surface of the intermediary blade section 310 connects the metal tip to a lightning receptor arranged in the intermediary blade section (not visible in this drawing, as it is covered by the metal strip 314). The lightning receptor is connected to a downconductor coupler inside the intermediary blade section, and the downconductor coupler is further coupled to a downconductor inside the blade 300 that can conduct lightning current to ground.

Figure 4:
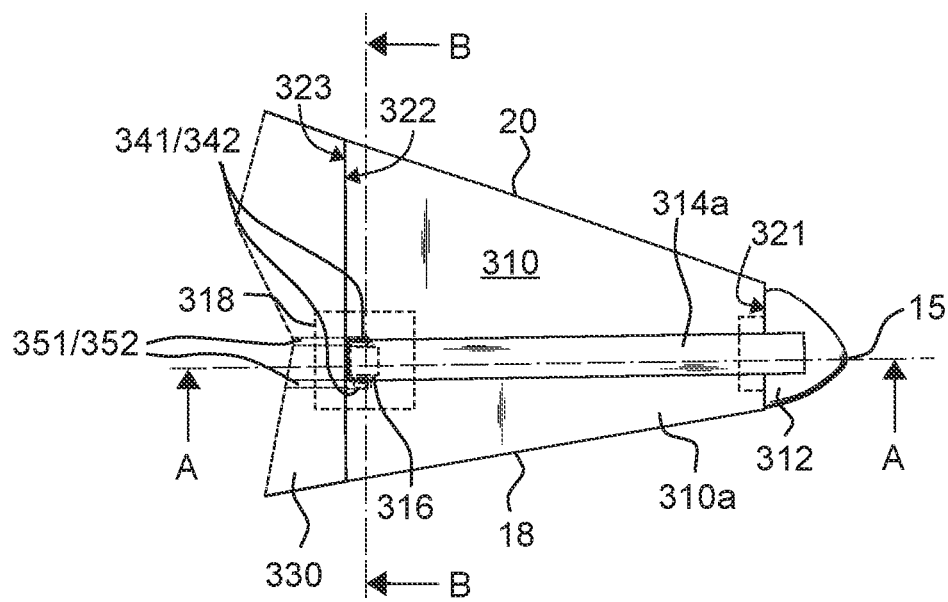
FIG. 4 schematically illustrates a tip section in accordance with an embodiment of the invention.
Figure 5:
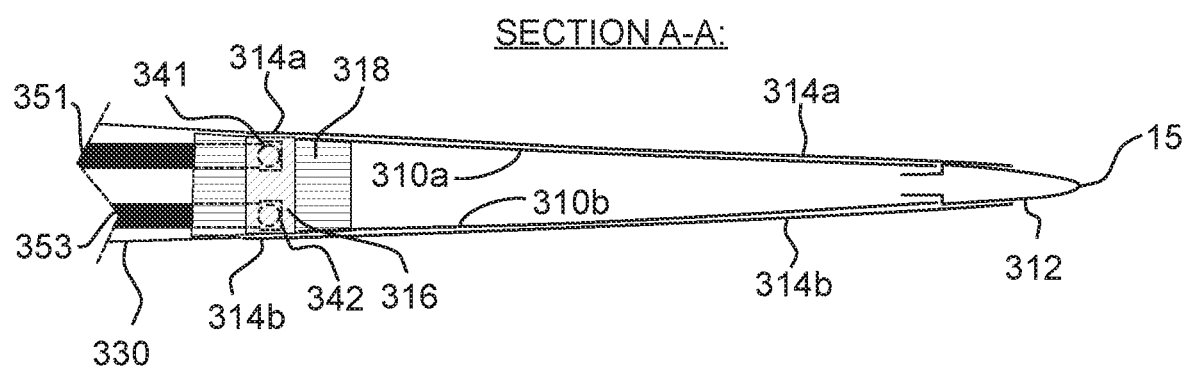
FIG. 5 schematically illustrates a cross-sectional view of a tip section in accordance with an embodiment of the invention.

FIG. 4 illustrates a tip section 301 in accordance with an embodiment of the invention, such as for use as the tip section of the wind turbine blade shown in FIG. 3. It is seen from a suction side of the wind turbine blade in FIG. 3. The tip section has an intermediary blade section 310, comprising shell parts 310a and 310b, extending from a first end 321 to a second end 322. The suction side shell part 310a of the intermediary blade section is visible. Shell part 310b is shown in FIG. 5. The tip section 301 further comprises a metal tip 312 attached at the first end 321 of the intermediary blade section 310. In this example, the tip section 301 comprises a downconductor coupler 316 inside the intermediary blade section and a metal strip 314a on the suction side 310a. For illustration purposes, a first blade part 330 of the blade 300 is indicated, showing how the tip section is connected at the second end 322 to a first end 323 of the first blade part 330. The first blade part 330 extends from the root end 31 (see FIG. 3) to the first end 323 of the first blade part 330. Together, the first blade part 330 and the tip section 301 make up the wind turbine blade 300. The downconductor may instead be part of the first blade part 330.

The metal tip 312 attracts lightning, which is generally very likely to strike at the tip end 15 of a wind turbine blade. The metal strip 314a provides a conductive path from the metal tip 312 to the downconductor coupler 316, which will electrically couple the metal tip to a blade downconductor in the final wind turbine blade. The metal strips on the outer surface of the tip section provide the only conductive path from the metal tip 312 to the downconductor coupler 316. It has been found that by not providing a conductor inside the shell from the tip to the downconductor, the risk of internal damage is actually reduced. The shell is very thin near the tip, which means that there is a significant risk of lightning flashing over from the outside of the tip to a conductor located inside the tip. The metal strips also increase the metallic area to which lightning may be attracted.

In the present example, the tip section also comprises insulation 318 inside the tip section, surrounding the downconductor coupler 316. The insulation may for instance be made of polyurethane or epoxy.

FIG. 4 also illustrates an example of how downconductor cables (351/352) may be attached in the final blade. In this case, this is achieved by attaching downconductor cable shoes 342 to the downconductor coupler 316 using screws 341 that engage with the downconductor coupler 316. This is shown in more detail below. Insulation 318, cable shoes 342, screws 341, and downconductor cables 351/352 are shown with dashed lines, since they are located behind the shell part 310a.

It is noted that insulation 318, cable shoes 342, screws 341, and downconductor cables 351/352 are not essential parts of the tip section 301, but are illustrated to show the tip section 301 as used in a wind turbine blade, such as blade 300 illustrated in FIG. 3.

The leading edge 18 and trailing edge 20 are also indicated.

In the embodiment in FIG. 4, the metal strip 314a is 500 mm long, 50 mm wide, and 1 mm thick, and the metal tip 312 is 100 mm long. The lengths are measured along a longitudinal axis of the intermediary blade section, which coincides with line A-A. These dimensions provide a conductivity sufficient to conduct very intense lightning strikes with limited damage to the metal strip 314a.

A projection of the metal strip 314a on the plane defined by the longitudinal axis and the chord is parallel to the longitudinal axis in this example. However, said projection may alternatively form an angle with the longitudinal axis. Note that the projection of the metal strip onto a plane normal to the chord typically forms an angle with the longitudinal axis, since the metal strip follows the surface of shell part 310a, which diverges from the longitudinal axis in the direction towards the second end 322, since the thickness of the shell increases in that direction.

In the embodiment shown in FIG. 4, a centerline of the metal strip 314a is positioned approximately at x=0.32 at the second end 322 and x=0.45 at the first end 321. In the present embodiment, the airfoil profile is such that the metal strip 314a is furthermore close to a point of maximum thickness of the intermediary blade section. This results in low wear on the metal strip 314a from dust and the like.

FIG. 5 illustrates the cross-section of the tip section 301 shown in FIG. 4 along the line A-A. Both shell sides 310a (suction side) and 310b (pressure side) are visible, and each side has a metal strip 314a, 314b that connects the metal tip 312 to the downconductor coupler 316. The downconductor coupler 316 is surrounded by the insulating material 318. The downconductor coupler 316 extends to the outer surfaces of the shell sides 310a and 310b and therefore also acts as lightning receptor on either side of the intermediary blade section 310.

An example of how the tip part 312 may be attached to the intermediary blade section 310 is described later.

FIG. 5 further indicates two cable shoes on downconductor cables 351, 353 being attached to the downconductor coupler 316. In this view, the downconductor cables 351, 353, cable shoes 342, and screws 341 are shown with dashed lines because they are located behind the downconductor coupler 316 and insulating material 318.

A first blade part 330 to which the tip section is eventually connected is also illustrated, similarly to FIG. 4.

The metal strips 314a, 314b connect at one end to the metal tip 312 and at the other end to the downconductor coupler 316, thereby providing electrical connection between the metal tip 312 and the downconductor coupler 316. As seen, there is no conductor connecting the metal tip 312 to the downconductor coupler 316 on the inside of the tip section, for the reasons described above.

Figure 6:
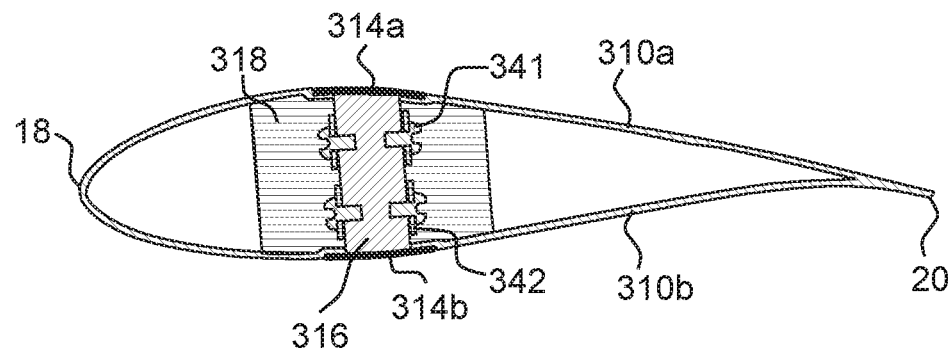
FIG. 6 schematically illustrates a cross-sectional view of a tip section in accordance with an embodiment of the invention.

In FIG. 5, the metal strips 314a, 314b are shown raised above the respective shell parts 310a, 310b to make it easier to discern the parts. However, to eliminate noise, the metal strips are preferably flush with the shell parts 310a, 310b, as illustrated in FIG. 6 and described below. This can be achieved for instance by forming the sides 310a, 310b with a recess having a shape that accommodates the respective metal strips 314a, 314b. The same applies at the tip part 312, which preferably has recesses similarly accommodating the metal strips 314a, 314b.

FIG. 6 illustrates the cross-section of the tip section 301 shown in FIG. 4 along the line B-B (see FIG. 4). Both shell sides 310a (suction side) and 310b (pressure side) are visible in this view. Each side has a metal strip 314a, 314b that connects the metal tip 312 to the downconductor coupler 316. In this view, the metal strips 314a, 314b are shown arranged in recesses in the corresponding shell parts 310a, 310b, which allows the surface of the tip section to have a more aerodynamic shape. This prevents noise and turbulence from being created by the metal strips 314a, 314b.

At the cross-section B-B shown in FIG. 6, a centerline of the metal strip 314a is positioned approximately at x=0.33. As discussed in relation to FIG. 4, this is close to a point of maximum thickness of the intermediary blade section 310, as can be seen in FIG. 6. This results in low wear from dust and the like. The same considerations apply to the metal strip 314b, also shown in FIG. 6.

FIG. 6 further shows, as an example, four conductor cable shoes 342 connected to the downconductor coupler with respective screws 341, corresponding to four downconductor cables, including cables 351, 352, 353 of FIGS. 4 and 5. The cables are not indicated in FIG. 6.

As illustrated in FIGS. 4-5, the downconductor coupler 316, cables shoes 342, and screws 341 are surrounded by the insulation material 318.

The leading edge 18 and trailing edge 20 are also indicated in FIG. 6.

Figure 7:
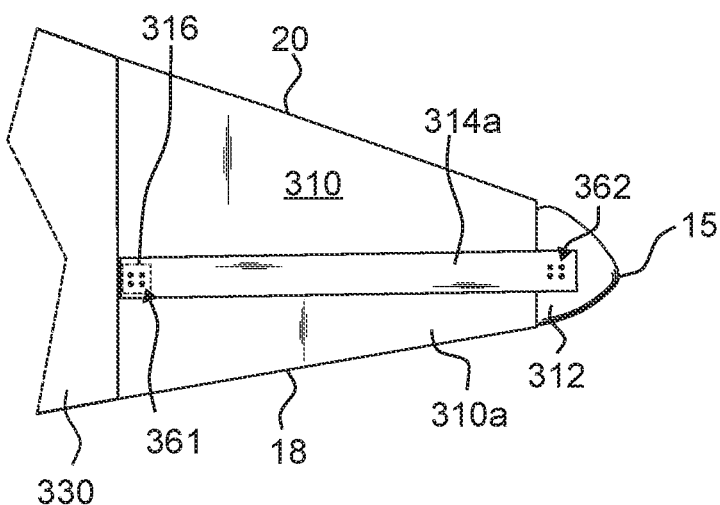
FIG. 7 schematically illustrates a tip section in accordance with an embodiment of the invention.

FIG. 7 illustrates a tip section 302 similar to the tip section 301 of FIGS. 4-6. FIG. 7 shows how in some embodiments the metal strip 314a may be fastened to the downconductor coupler 316 and the metal tip 312 with fastening means 361 such as a number of bolts or screws, in this example four bolts in either end.

The metal tip 312 may also be formed integrally with one or more of the metal strips 314a, 314b. Bolts or screws can be used to fasten the metal strips to the downconductor coupler 316.

Figure 8:
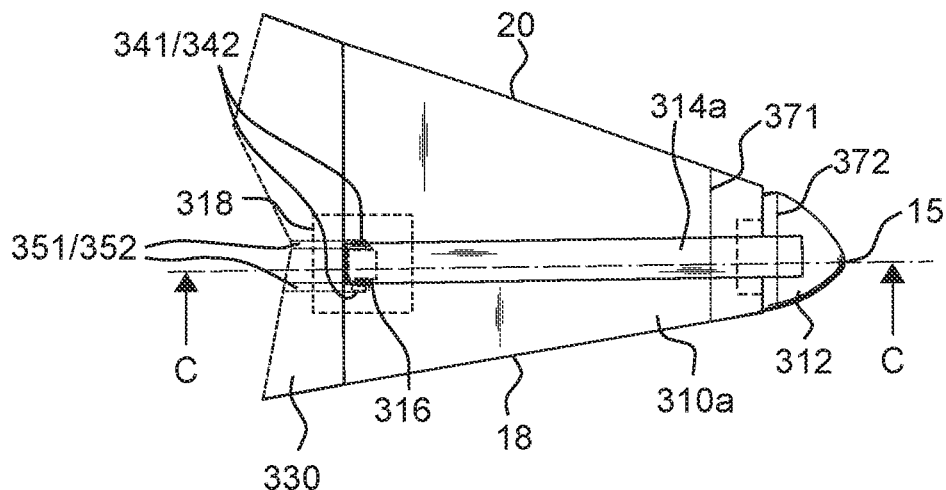
FIG. 8 schematically illustrates a tip section in accordance with an embodiment of the invention.
Figure 9:
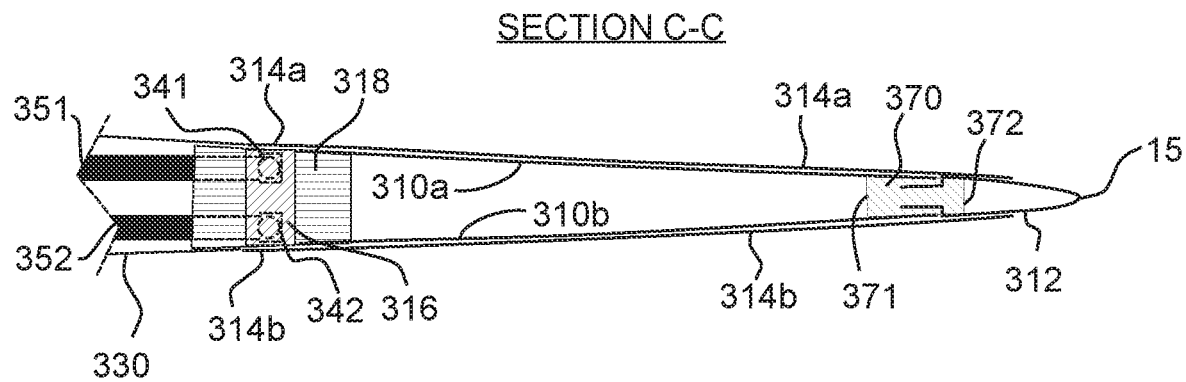
FIG. 9 schematically illustrates a cross-sectional view of a tip section in accordance with an embodiment of the invention.

FIG. 8 illustrates a tip section 303 in which the metal tip 312 is attached to the intermediary blade section 310 using for instance an epoxy to create a bonding epoxy piece 370 (further illustrated in FIG. 9 below). The epoxy piece 370 extends from inside the intermediary blade section 310 and into the metal tip 312, thereby bonding the two together. The epoxy piece 370 is located inside the intermediary blade section 310 and metal tip 312 and has therefore been indicated by schematic dashed lines 371, 372 indicating two ends 371, 372 of the epoxy piece 370. FIG. 9 illustrates the cross-section of the tip section 303 shown in FIG. 8 along the line C-C, showing the epoxy piece 370 extending between the intermediary blade section 310 and the metal tip 312 and bonding them together. Another advantage of the epoxy piece 370 is that it provides a dielectric barrier that reduces the risk of flashover from the metal tip 312 to electrically conductive components inside the blade, such as a carbon-fibre reinforced spar part. The ends 371, 372 are not necessarily regular as indicated by the planar ends of epoxy piece 370 in FIGS. 8 and 9.

Figure 10:
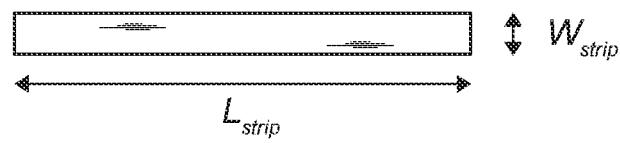
FIGS. 10-11 schematically illustrate metal strips for a tip section.

FIG. 10 illustrates the metal strip 314a from FIG. 4 in isolation. The metal strip in this example is rectangular, having a length $L_{strip}$ and a width $W_{strip}$. As described in relation to FIG. 4, the metal strip 314a is 500 mm long, 50 mm wide, and 1 mm thick. However, other parameters may be chosen as needed.

Figure 11:
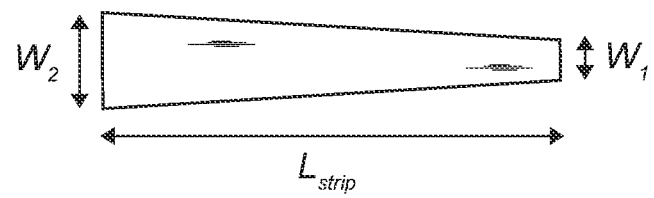

FIG. 11 illustrates a metal strip 1114 that is tapered, having one width $W_1$ at one end and a different width $W_2$ at the other end, and a length $L_{strip}$. Shapes other than those shown in FIGS. 10-11 may be used as appropriate.

Figure 12:
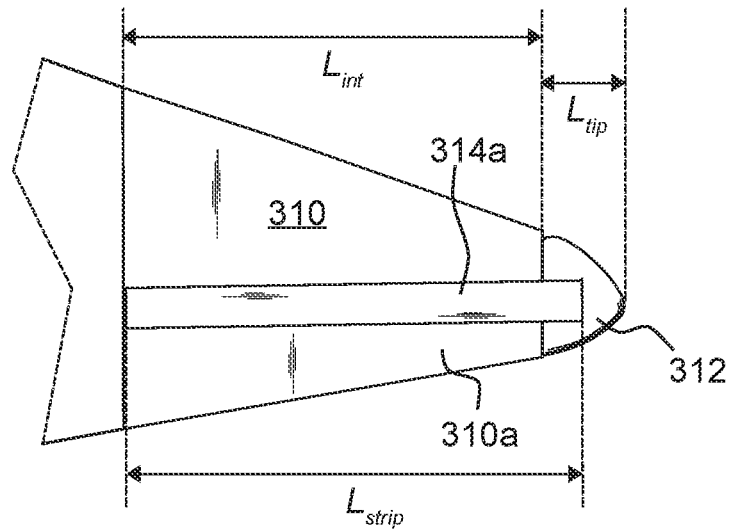
FIG. 12 illustrates exemplary length definitions of parts of a tip section.

FIG. 12 illustrates exemplary definitions of a length $L_{int}$ of the intermediary blade section (shell part 310a), a length $L_{tip}$ of the tip part 312, and a length $L_{strip}$ of the metal strip 314a. The tip section in FIG. 12 is the tip section 301 shown in FIG. 4. In this example, the lengths are generally measured relative to a longitudinal axis of the blade.

FIGS. 13-16 illustrate an example of how a tip section 1301 can be attached to a first blade part 330.

Figure 13:
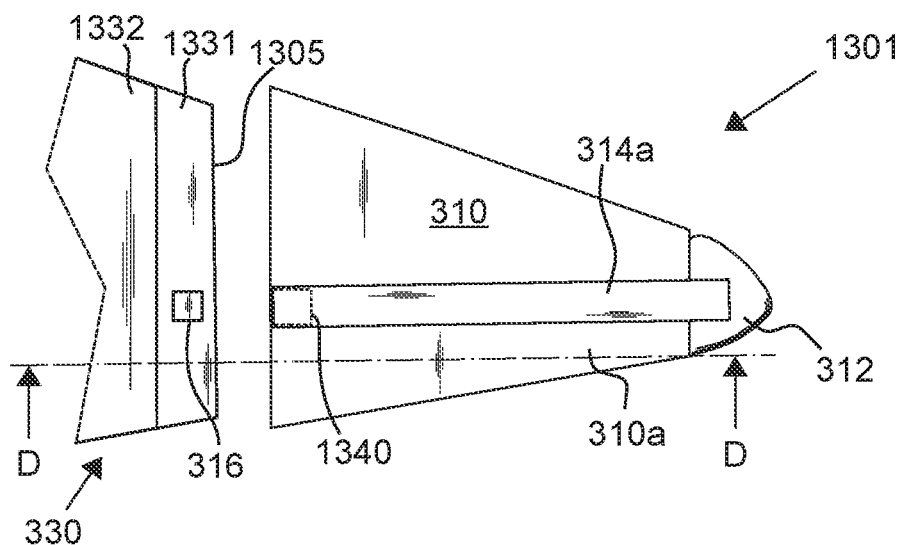
FIGS. 13-16 illustrate a tip section being joined to a first blade part.
Figure 14:
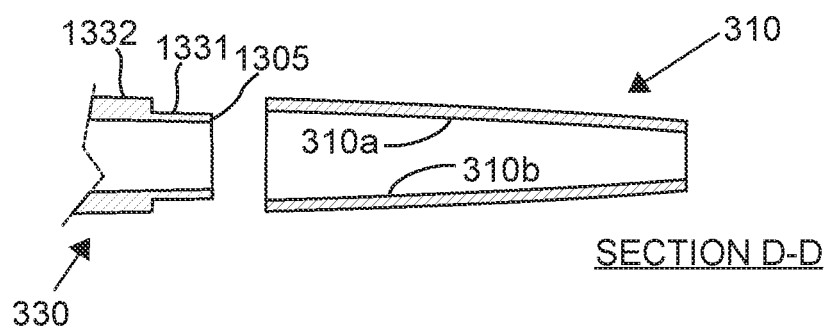

Referring to FIG. 13, the first blade part 330 in this embodiment has been manufactured with a first section 1331 that steps down from a second section 1332 near the end 1305 of the first blade part. In accordance with the first aspect of the invention, the tip section 1301 to be attached to the first blade part 330 comprises a first intermediary blade section 310, a tip part 312, and a metal strip 314a on the surface of the intermediary blade section 310. Cross-section D-D indicated in FIG. 13 is shown in FIG. 14, which illustrates the step from section 1332 to section 1331 in the first blade part in more detail. The step may for instance be made in a mould having a corresponding step.

The first blade part 330 also comprises a metal piece 316 extending the first side 310a to the second side 310b. The metal piece doubles as lightning receptor on either side.

Figure 15:
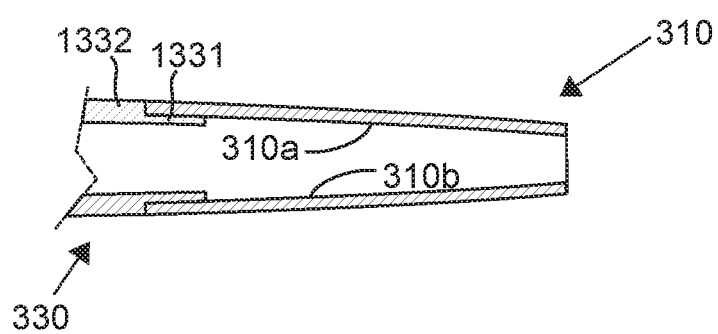

The step from second section 1332 to first section 1331 is configured to engage with an inner surface of the intermediary blade section 310. FIG. 15 shows the first blade part 330 has been joined with the intermediary blade section 310 of the tip section 1301. In this embodiment, a thickness of a wall of the intermediary blade section 310 is such as to form, together with the first section 1331 of the first blade part 330, a wall having a thickness equal to a thickness of the second section 1332 of the first blade part 330 near the first section 1331. With this design, little finishing processing is required to achieve a flush surface after the first blade part 330 and the tip section 1301 are joined.

The intermediary blade section 310 has a cutout 1340 that can accommodate the metal piece 316, whereby the tip section can easily slide onto the first blade part.

An adhesive may be used to adhere the inner surface of the intermediary blade section 310 to the surface of the first section 1331 of the first blade part 330, whereby the completed shell is obtained. For simplicity, and in accordance with the indication of cross-section D-D in FIG. 13, the cross-section D-D does not include the tip part 312, which is therefore not part of FIGS. 14 and 15.

Figure 16:
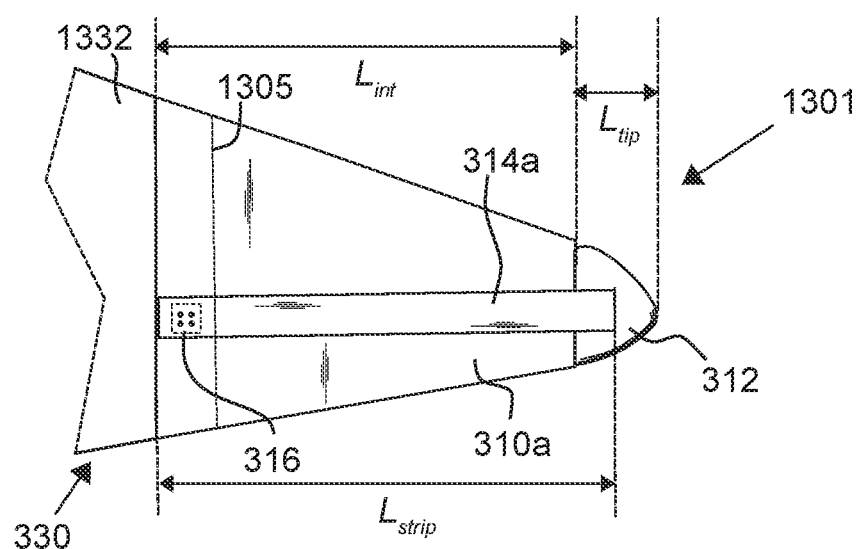

FIG. 16 illustrates the combined first blade part 330 and tip section 1301 with metal strip 314a bolted to the metal piece 316. The end 1305 of the first blade part is located inside the intermediary blade section 310, as described above.

If the tip section 1301 becomes damaged to a critical degree, it can be replaced by a new tip section. To achieve this, the blade is cut through at the end of the first section 1331 of the first blade part 330, i.e. at end 1305. Then, the material from the damaged intermediary blade section of the damaged tip section overlapping section 1331 is ground away to restore the step from first section 1331 to second section 1332 of the first blade part 330. The new tip section can then be joined to the first blade part 330.

LIST OF REFERENCES 2 wind turbine
4 tower
6 nacelle
8 hub
10 blade
14 blade tip
15 tip end
16 blade root
18 leading edge
20 trailing edge
30 root region
31 root end
32 transition region
34 airfoil region
36: pressure side shell part
38: suction side shell part
40 shoulder
300 wind turbine blade
301-303 tip section
310 intermediary blade section
310a, 310b intermediary blade section sides
312 tip part
314 metal strip
314a, 314b metal strip
316 lightning receptor/solid metal piece. downconductor coupler
318 insulation for solid metal piece
321 intermediary blade section first end
322 intermediary blade section second end
323 first blade part first end
330 first blade part
341 screw
342 cable shoe
351-353 downconductor cable
361, 362 fastening means, bolts, screws
370-372 epoxy piece
1114 metal strip
1301 tip section
1305 first blade part edge
1331 first section of first blade part
1332 second section of first blade part
1340 cutout
$L_B$ length/longitudinal axis of blade
$L_{tip}$ length of tip part
$L_{int}$ length of intermediary blade section $L_{strip}$ length of metal strip
$W_{strip}$ width of metal strip
$W_1$, $W_2$ width of metal strip

The invention claimed is:

1. A replaceable wind turbine blade tip section (301, 302, 303, 1301) for a wind turbine blade, the replaceable wind turbine blade section (301, 302, 303, 1301) being configured for attachment to a main blade section, the replaceable wind turbine blade section (301, 302, 303, 1301) comprising:
an intermediary blade section (310) comprising a first shell part (310a) forming a first side of the intermediary blade section (310) and a second shell part (310b) forming a second side of the intermediary blade section (310), the intermediary blade section (310) having a leading edge (18) and a trailing edge (20) and extending from an intermediary blade section first end (321) to an intermediary blade section second end (322),
a tip part (312) forming an end of the tip section (301, 302, 303, 1301) and having been rigidly attached to the intermediary blade section first end (321), the tip part (312) having an outer surface comprising a metal area,
a number of one or more superficial metal strips (314a, 314b) extending along an outer surface of the intermediary blade section (310), wherein each of the one or more superficial metal strips (314a, 314b) has a first end connected to the metal area of the tip part (312), and a second end configured for electrical connection to a downconductor cable (351, 352, 353) of the main blade section.

2. The replaceable wind turbine blade tip section in accordance with claim 1, wherein at least one of the superficial metal strips (314a, 314b) is arranged at a distance from the leading edge (18) and the trailing edge (20).

3. The replaceable wind turbine blade tip section in accordance with claim 1, wherein at least one of the superficial metal strips (314a, 314b) is placed near a thickest portion of the intermediary blade section (310).

4. The replaceable wind turbine blade tip section in accordance with claim 1, wherein a chordwise position of a centerline of at least one of the superficial metal strips (314a, 314b) lies in the range x=0.2 to x=0.7, where x is the chordwise airfoil coordinate and x=0 coincides with the leading edge (18) and x=1 coincides with the trailing edge (20).

5. The replaceable wind turbine blade tip section in accordance with claim 1, wherein the one or more superficial metal strips (314a, 314b) are substantially parallel to a longitudinal axis of the intermediary blade section (310).

6. The replaceable wind turbine blade tip section in accordance with claim 1, wherein the one or more superficial metal strips (314a, 314b) are arranged in recesses in the first and second shell parts (310a, 310b) to achieve a flush surface around the one or more superficial metal strips (314a, 314b).

7. The replaceable wind turbine blade tip section in accordance with claim 1, further comprising:
a downconductor coupler (316) arranged inside the intermediary blade section (310), the tip part (312) being electrically connected to the downconductor coupler (316) only via the one or more superficial metal strips (314a, 314b).

8. A method of manufacturing a wind turbine blade having a root end and a tip end, comprising:
providing a first blade part (330) having an airfoil region, a root end connectable to a wind turbine hub, and a first end (323, 1305) opposite the root end,
providing the replaceable wind turbine blade tip section (301, 302, 303, 1301) in accordance with claim 7, and rigidly joining the first end (323, 1305) of the first blade part (330) to the intermediary blade section second end (322).

9. The method in accordance with claim 8, further comprising surrounding the downconductor coupler (316) with a non-conductive material.

10. The replaceable wind turbine blade tip section in accordance with claim 7, wherein the downconductor coupler (316) comprises a metal piece that extends to an outer surface of the first shell part (310a) and is electrically connected to exactly one of the number of one or more superficial metal strips (314a, 314b).

11. The replaceable wind turbine blade tip section in accordance with claim 7, wherein the number of superficial metal strips (314a, 314b) is exactly two, wherein a first metal strip of the two superficial metal strips (314a, 314b) is arranged on the first side of the intermediary blade section (310), and a second metal strip of the two superficial metal strips (314a, 314b) is arranged on the second side of the intermediary blade section (310).

12. The replaceable wind turbine blade tip section in accordance with claim 11, wherein the downconductor coupler (316) comprises a metal piece that extends to an outer surface of the first shell part (310a) where it is electrically connected to the first metal strip, and the metal piece of the downconductor coupler (316) further extends to an outer surface of the second shell part (310b) where it is electrically connected to the second metal strip.

13. The replaceable wind turbine blade tip section in accordance with claim 1, wherein a length, Lint, of the intermediary blade section (310) is in the range 15-100 cm.

14. The replaceable wind turbine blade tip section in accordance with claim 1, wherein the tip part (312) is made of copper or a copper alloy.

15. The replaceable wind turbine blade tip section in accordance with claim 1, wherein a length, Lstrip, of all of the superficial metal strips (314a, 314b) is in the range 20-110 cm, a width, W, of all of the superficial metal strips (314a, 314b) is in the range 30-100 mm, a thickness of all of the superficial metal strips (314a, 314b) is in the range 2-30 mm, and a length, Ltip, of the tip part (312) is in the range 30-200 mm.

16. A wind turbine blade having a root end and a tip end, wherein the wind turbine blade comprises the replaceable wind turbine blade tip section (301, 302, 303, 1301) in accordance with claim 1.

17. The wind turbine blade in accordance with claim 16, wherein the wind turbine blade comprises a first blade part (330) having an airfoil region (34), a root end (31) connectable to a wind turbine hub, and a first end (323, 1305) opposite the root end (31), the first end (323, 1305) of the first blade part (330) being rigidly joined to the tip section at the intermediary blade section second end (322).

18. The wind turbine blade in accordance with claim 17, wherein a thickness of a wall of the first blade part (330) at the first end (323) comprises a step (1331, 1332) that overlaps with a wall of the intermediary blade section (310) to form a flush blade surface.

19. The wind turbine blade in accordance with claim 16, wherein the one or more superficial metal strips (314a, 314b) are substantially parallel to a longitudinal axis of the first blade part (330).

* * * * *